Sept. 24, 1968 M. G. DEL DUCA 3,403,053
ENZYME ACTIVATED BIOCHEMICAL BATTERY
Filed July 9, 1962
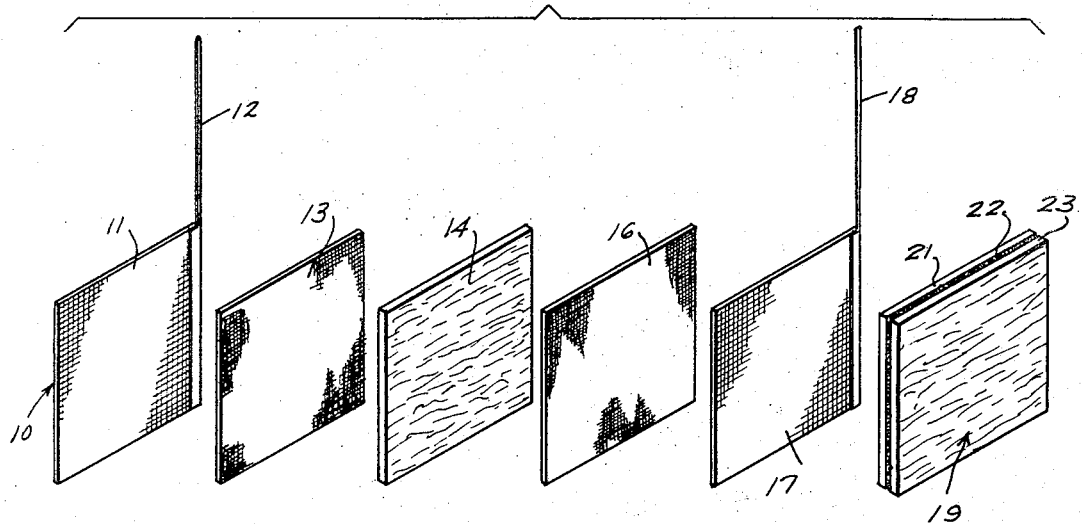
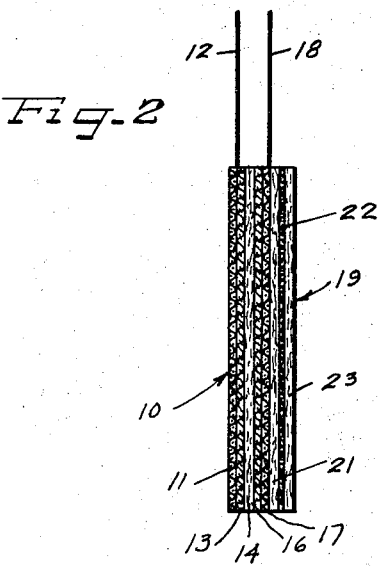
INVENTOR.
Michael G. Del Duca
BY
ATTORNEYS United States Patent Office 3,403,053
Patented Sept. 24, 1968

3,403,053
ENZYME ACTIVATED BIOCHEMICAL BATTERY
Michael G. Del Duca, Rocky River, Ohio, assignor to TRW Inc., a corporation of Ohio
Filed July 9, 1962, Ser. No. 208,243
4 Claims. (Cl. 136—86)

The present invention relates to enzyme activated biochemical batteries designed to provide electrical power in areas where the supply of fuel is restricted to biological materials or where a supply of biological materials is readily available.

In previously proposed biological batteries, the organisms were employed to catalyze half cell reactions or to depolarize the half cell reactions, permitting the electrochemical generation of power to proceed. These batteries, therefore, involved direct participation of the biological organisms or enzymes in the electrochemical generation of power.

In accordance with the present invention, enzymes are employed not in the direct generation of electrical power, but to convert the biological material to form fuels which are consumable at the anode and thereupon participate in an electrochemical reaction with oxygen. With the system of the present invention, the enzymes can be substantially isolated from the surfaces of the electrodes and thereby avoid the problems which have heretofore occurred in attempting to maintain an active biological mass at the surface of the electrodes.

An object of the present invention is to provide an improved electrochemical cell employing enzymes to react with available biological materials to generate a fuel for the cell.

Another object of the invention is to provide an improved electrochemical cell employing enzyme catalysts in which the enzymatic materials can be substantially isolated from the surface reactions at the electrodes of the cell.

A further object of the invention is to provide an electrochemical cell which can be extremely small in size. A further object of the invention is to provide an electrochemical cell assembly which can be built up in laminated fashion from a large number of individual cell units.

The fuel which participates in the oxidation reduction reaction with oxygen results from the enzymatic-action of selected enzymes upon biological materials. Typically, the biological materials may be waste products including, by way of example, materials such as milk, sewage, urea, or other materials which contain organic reactants which react with particular enzymes in the generation of a fuel.

The enzymes useful in accordance with the present invention are those which are compatible with the other components of the cell and which react with the biological materials present to generate ammonia, hydrogen, or other fuel. While there are a wide variety of systems which can be employed, the following table illustrates several specific combinations:

| Organic Reactant | Enzyme | Fuel |
|---|---|---|
| Urea | Urease | Ammonia. |
| Amides | Asparaginase | Do. |
| Do | Glutaminase | Do. |
| Do | Amino-acid Amidase | Do. |
| Unsaturated Amino-acids | Dehydropeptidases | Do. |
| Amines | Amine oxidases | Do. |
| Histadine | Histidase | Do. |
| Guanine | Guanase | Do. |
| Serine | Serine dehydrase | Do. |
| Cysteine | Cysteine desulphhydrase | Do. |
| Threonine | Threonine dehydrase | Do. |
| Succinic acid | Succinic dehydrogenase | Hydrogen. |
| Formic acid | Formic hydrogenlyase | Do. |

A further description of the present invention will be made in conjunction with the attached sheet of drawings which illustrate the preferred embodiment.

In the drawings:
FIGURE 1 is an exploded view of a laminated cell construction in accordance with the present invention; and
FIGURE 2 is a view in elevation of the assembled cell, with the thickness of the components being exaggerated somewhat for purposes of clarity.

As shown in the drawings:
In the exploded view of FIGURE 1, reference numeral 10 indicates generally a cathode structure composed of a nickel mesh 11, for example, impregnated with a mixture of activated carbon and platinum. A current conductor 12 is soldered or otherwise secured to the mesh 11. Disposed next to the cathode 10 is an ion exchange membrane 13 of the cation type, impermeable to liquid. This membrane functions as an ionic transport and as a barrier for keeping liquid electrolyte from entering and flooding the cathode 11.

Adjacent the ion exchange membrane 13 is a pad 14 composed of a pulp sheet saturated with an electrolyte such as silver chloride, ammonium hydroxide, or a mixture of silver chloride and potassium chloride. Immediately adjacent the pad 14 is an ion exchange membrane 16 of the anion type. This membrane prevents the liquid electrolyte from entering the anode and provides ionic conductance for the cell.

The anode 17 illustrated in FIGURE 1 takes the form of a nickel mesh having a current conductor 18 soldered or otherwise secured thereto. The anode 17 may also be composed of copper or the like, if suitable means, such as indium coating is employed to protect the surface from the ammonia generated in the system.

The fuel generator has been indicated at reference numeral 19 of the drawings. In the form of the invention shown, the fuel generator 19 is composed of a laminated structure consisting of a first pulp pad 21 (e.g., "Ni-Cell") saturated with urea, a layer of jack-bean meal 22 (a source of urease) and a dry pulp pad 23 forming the outer barrier. The two pads 21 and 23 are compressed with the meal 22 between them into a composite which can then be pressed onto the surface of the anode 17.

In assembled relation, as illustrated in FIGURE 2, the outer end of the cathode 10 is exposed to atmospheric air which provides a source of oxygen for the cell. The oxygen then reacts with the ammonia generated by the reaction of the unrease on the urea in the normal electrochemical reaction utilizing an oxygen cathode and an ammonia anode.

Structural details of the cell can be varied widely, as evident from the following specific examples.

EXAMPLE I

The ammonia generating medium consisted of a "Ni-Cell" saturation paper impregnated with urea, dried, and laminated with jack-bean meal and dry sheet of "Ni-Cell" under 10 tons pressure. The electrolytic material used was a saturated solution of mercurous chloride and potassium chloride. The electrodes consisted of a platinum-carbon cathode and a nickel screen anode. With the application of pressure to this cell, the voltage obtained was 0.67 volt, and upon release of pressure, the voltage dropped rapidly to a setady 0.5 volt. A dead short circuit current of 100 milliamperes was obtained. When the load was removed, the output rose to 0.5 volt. This cell was left overnight at a 12 ma. drain, at which point the voltage was 0.3 volt. Fifteen hours later the output under the same load was 0.1 volt at 4 ma. The original voltage, or close to it, could be restored by adding additional amounts of the electrolyte.

EXAMPLE II

An improved electrode structure was made up of the following ingredients:

| | Parts by weight |
|---|---|
| Activated carbon | 1 |
| Platinum black | 2 |
| Water | 1.5 |
| 2% solution of acrylic polymer ("Cyanamer 370") | 0.5 |

The material was mixed thoroughly, applied as a paste to a nickel screen, and oven dried at 100° C. The cathodes of this material gave a voltage of 0.5 to 0.55 volt when employing a nickel mesh anode.

EXAMPLE III

The voltage of the cell varies considerably, depending upon the electrolyte material employed. Using the same urease system outlined in the previous examples, a saturated solution of silver chloride-potassium chloride produced a voltage of 0.3 volt. Upon application of pressure, the voltage went to a maximum of 0.62 volt. A dry pad saturated with silver chloride crystals provided a voltage of 0.92 volt, and a short circuit current from this cell of 0.1 amp.

As indicated from the foregoing examples, the preferred combination for the purposes of the present invention is urea and urease, derived from jack-bean meal. The rate of enzymatic reaction can be varied somewhat by controlling the particle size of the urease, and by combining the urease with a diluent such as starch. It is also advisable to moisten the pads containing the urea and urease and permit them to stand for several hours to assure the generation of adequate amounts of ammonia.

The cells produced according to the present invention exhibit excellent recovery. A 0.5 volt cell which yields 20 ma. on a dead short recovered 60% of its voltage in seven seconds, and 80% in two minutes. This recovery can be made repeatedly, apparently without damaging the cell.

It should be evident that various modifications can be made to the described embodiments without departing from the scope of the present invention.

I claim as my invention:

1. An electrochemical cell comprising a laminated structure including an electrode comprising a porous backing coated with an organic material, a dry layer of enzyme containing material pressed into said organic material, the enzyme being one which is capable of decomposing said organic material to yield a fuel gas for a fuel cell reaction, a first liquid impervious ion exchange membrane sealing off one face of said electrode, a porous pad saturated with an inorganic salt electrolyte solution, a second liquid impervious ion exchange member of a conductivity type opposite to that of said first membrane spaced from said first membrane with said porous pad being confined therebetween, and a non-consumable electrode in face to face contact with said second ion exchange membrane.

2. The cell of claim 1 in which said fuel gas is ammonia.

3. The cell of claim 1 in which said organic material is urea and said enzyme is urease.

4. The cell of claim 1 in which said organic material is urea, said enzyme is urease, and said electrolyte contains potassium chloride and a member of the group consisting of silver chloride and mercurous chloride.

References Cited

UNITED STATES PATENTS

| 3,228,799 | 1/1966 | Rohrback | 136—86 |
| 3,238,066 | 3/1966 | Klass et al. | 136—86 |

OTHER REFERENCES

16th Annual Power Sources Conference, May 22–24, 1962, pages 18–21.

Business Week, May 6, 1961, p. 68.

Industrial Research, October 1961, pages 23–24.

Journal of Bacteriology, vol. 21, January–June 1931, pp. 18–19.

Popular Science, January 1962, p. 29.

Science and Mechanics, August 1961, pages 116–117.

WINSTON A. DOUGLAS, *Primary Examiner.*

H. FEELEY, *Assistant Examiner.*